(12) United States Patent
Brianti et al.

(10) Patent No.: US 6,324,225 B1
(45) Date of Patent: *Nov. 27, 2001

(54) TIMING RECOVERY FOR DATA SAMPLING OF A DETECTOR

(75) Inventors: Francesco Brianti, San Jose, CA (US); Marco Demicheli, Binago (IT)

(73) Assignee: STMicroelectronics, Inc., Carrollton, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,512

(22) Filed: Dec. 22, 1997

(51) Int. Cl.$^7$ .................... H04L 27/06; H03M 13/03
(52) U.S. Cl. ................................ 375/341; 714/794
(58) Field of Search ............................ 375/341, 376, 375/375, 340, 290, 294; 350/46, 51, 65; 714/794, 795, 798

(56) References Cited

U.S. PATENT DOCUMENTS

| | | | |
|---|---|---|---|
| 4,644,564 | 2/1987 | Dolivo et al. | 375/291 |
| 4,942,593 * | 7/1990 | Whiteside et al. | 375/372 |
| 5,375,145 | 12/1994 | Abbott et al. | 375/345 |
| 5,521,767 | 5/1996 | Weng et al. | 360/46 |
| 5,557,638 * | 9/1996 | Fisher et al. | 375/286 |
| 5,585,975 * | 12/1996 | Bliss | 360/65 |
| 5,696,793 * | 12/1997 | Hashimura | 375/294 |
| 5,717,619 * | 2/1998 | Spurbeck et al. | 708/319 |
| 5,754,353 * | 5/1998 | Behrens et al. | 360/53 |
| 5,961,658 * | 10/1999 | Reed et al. | 714/746 |

* cited by examiner

Primary Examiner—Chi Pham
Assistant Examiner—Khai Tran
(74) Attorney, Agent, or Firm—Lisa K. Jorgenson; Bryan A. Santarelli

(57) ABSTRACT

A partial response Class 4 detector in a recording and retrieval system and method of operating the detector for correcting the timing error of the detector. The detector includes a sequence table and comparison circuitry for comparing a sequence of data samples that includes previous and subsequent data samples with allowed sequences determined from the sequence table. When the sequence is an allowed sequence then there is high likelihood that data sample is correct, and the timing error for the data sample is determined in the phase error estimator and is corrected for. Otherwise, no correction is made for the timing error. In the preferred embodiment of the invention the coordinates of the sequence table correspond to the data samples, and the slope of the data stream at the data sample is stored in the sequence table. This reduces the size and increases the speed of the phase error estimator since the slope is now provided to it from the sequence table and it does not need determine the slope.

28 Claims, 2 Drawing Sheets

TIMING RECOVERY FOR DATA SAMPLING OF A DETECTOR

TECHNICAL FIELD

The present invention relates to improvements in a detector for data sampling, and is more specifically related to the timing recovery of a detector during data sampling.

BACKGROUND

Increasing density of data transmitted or stored reduces the cost of transmitting and storing the data and the time it takes to transmit and store data. Therefore, it has been a long term goal of the electronics industry to increase the density of data transmitted or stored. Many systems use run-length limited (RLL) coding and peak detection (PD) to achieve high reliability and high densities. A further increase in density can be achieved using more advanced techniques such as partial response (PR) signaling and maximum-likelihood (ML) sequence detectors such as Viterbi detectors, or a combination of the two.

Partial response (PR) signaling is a technique that enforces spectral properties and allows a controlled amount of intersymbol interference. ML sequence estimation, and particularly the Viterbi algorithm, improves the detection of symbol sequences in the presence of intersymbol interference. ML sequence estimation allows most PR schemes to perform practically in a system with errors caused by intersymbol interference.

PR signaling also allows a better handling of intersymbol interference and a more efficient utilization of the bandwidth of a given channel. Because the intersymbol interference is known to be present, the receiver can take it into account. PR signaling in communications allows transmissions at the Nyquist rate, and provides a favorable trade-off between error probability and the available spectrum. The PR systems described by the polynomials 1+D, 1−D, and 1−D$^2$ are called duobinary, dicode, and class-IV, respectively, where D represents one bit cell delay and D$^2$ represents 2 bit cell delays. D=e$^{-j\omega t}$, where ω is a frequency variable in radians per second and t is the sampling time interval in seconds. The PR4 magnitude response, 1−D$^2$, emphasizes midband frequencies and results in a read channel with increased immunity to noise and distortion at both low and high frequencies.

Conventional disc drives are used to record and to retrieve information. As discs become more prevalent as the medium of choice for storing information in both computer and home entertainment equipment, disc drives likewise become more prevalent and important components of such electronic systems. PR and ML have been employed in communications signaling for many years, and have now been applied commercially within magnetic hard disk drives. PR4 is presently a preferred partial response system in disc drives, since there is a close correlation between the idealized PR4 spectrum, and the natural characteristics of a magnetic data write/read channel. Application of the Viterbi algorithm to PR4 data streams within a magnetic recording channel is known to improve detection of original symbol sequences in the presence of intersymbol interference and also to improve signal to noise ratio over comparable peak detection techniques.

EPR4 and EEPR4 are higher order PR detection schemes that further increase the density of data that can be stored and transmitted.

FIG. 1 shows a portion of a conventional detector 10, the detector 10 can be a PR4, EPR4, or an EEPR4 detector. The detector 10 has a slicer 20 that samples a data stream to obtain data samples x'(T).

The output of the slicer 20 is also connected to a phase error estimator 22, typically through an equalizer (not shown). The phase error estimator 22 is coupled to a D to A converter 24 whose output is provided to an oscillator 26, which generates the clock, clk(T), that clocks the slicer 20 to control the data sample rate. Each data sample x'(T) is passed to the phase error estimator 22 that determines the timing error for the sample x'(T) and outputs a signal that adjusts the clock frequency of the oscillator 26.

The output of the slicer 22 is also connected to a Viterbi detector. The slicer 22 outputs a sequence of data samples, which are input to the Viterbi detector 28 for analysis and detection to aid in obtaining the decoded data. The output of the Viterbi detector 28 provides the data stream to the system for further detection and analysis.

A problem with PR detectors 10 is that as the density increases or as the complexity of the detector increases the same amount of noise that was previously acceptable can cause false detection of the sample. A false detection can lead to a timing error that will cause the oscillator to adjust the clock frequency to an incorrect frequency. Clocking the slicer 20 at a frequency that does not match the data rate will cause the slicer 20 to sample the next data sample at the wrong time, which will lead to an incorrect data value and to an incorrect timing error for the next data sample, leading to the data value after that being sampled at the wrong time, and so on.

SUMMARY OF THE INVENTION

A detector for receiving data in accordance with the present invention includes a slicer, a sequence table of allowed sequences, and comparison circuitry. The slicer has an input terminal coupled to a read channel and an output terminal coupled to the first input terminal of the comparison circuitry. The sequence table has an output terminal coupled to the second input terminal of the comparison circuitry. The output terminal of the comparison circuitry is coupled to an input terminal of a phase error estimator.

In accordance with the method of operation of the circuit of the present invention, a data sample, a predetermined number of previous data samples and a predetermined number of subsequent data samples are obtained. Some of the data samples are used to form a sequence. The sequence is compared with the values in the sequence table to determine if it is an allowed sequence. If the sequence is an allowed sequence, the timing error of the detector is corrected based on the timing error of the data sample.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

Appendix A is a program in Matlab for generating a sequence table for an EPR4 detector.

Appendix B shows all sequences that can occur in an EPR4 detection scheme.

Appendix C shows the values of the sequence table for an EPR4 detector.

DETAILED DESCRIPTION OF THE PREFERRED EMBODIMENT

Figure 1:
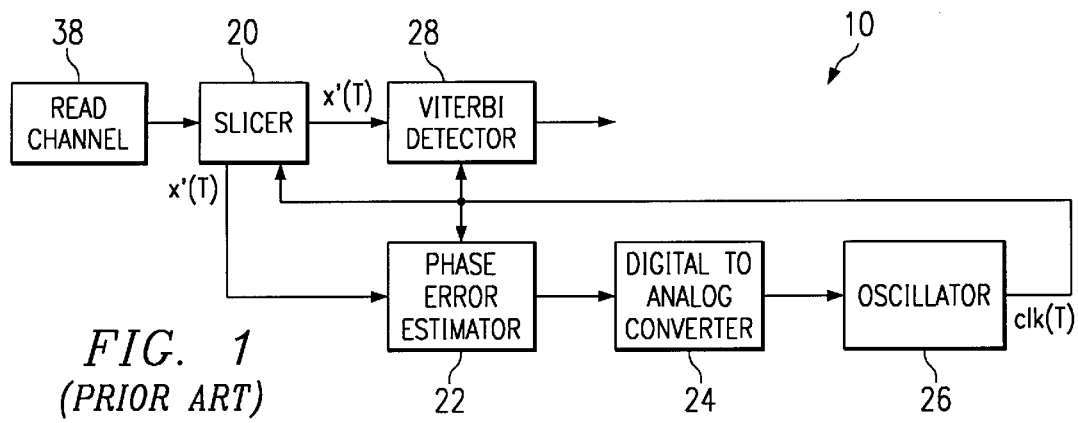
FIG. 1 is a block diagram of a portion of a conventional detector.
Figure 2:
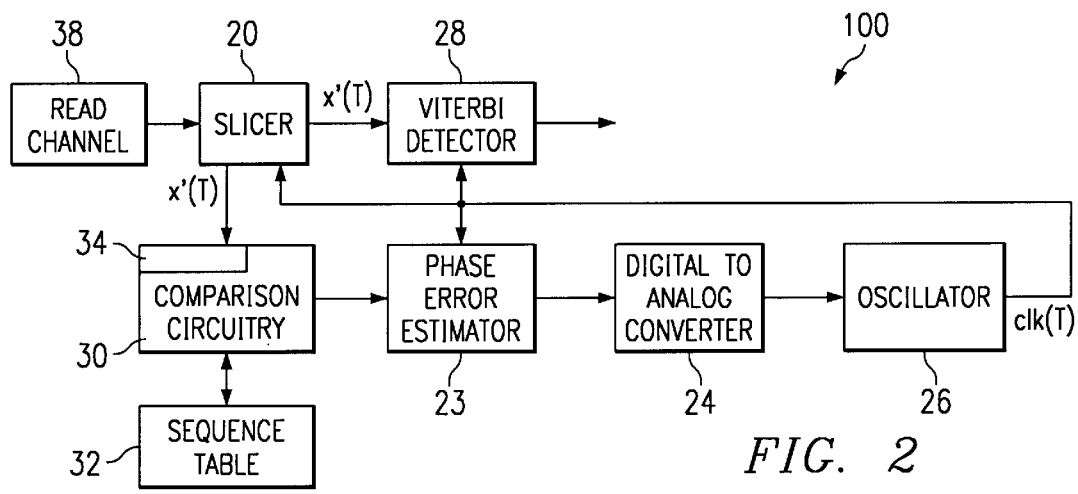
FIG. 2 is a block diagram of a portion of a detector according to an embodiment of the present invention.

Referring to FIG. 2, a portion of a detector according to an embodiment of the invention is designated generally by reference numeral 100. The detector 100 is typically included in a recording and retrieval system, such as a disc drive 110, shown in FIG. 5. Parts common to FIGS. 1 through 5 are indicated using the same numbering system.

Referring to FIG. 2, the detector 100 can be any acceptable type of detector, such as a PR4, EPR4, or an EEPR4 detector. The detector includes a slicer 20 that samples a data stream to obtain data samples x'(T). The input of the slicer 20 is coupled to an output of a read channel 38 that reads the data stream from a storage device, such as a disc. The output of the slicer 22 is connected to a Viterbi detector 28. The slicer 22 outputs a sequence of data samples x'(T), which are input to the Viterbi detector 28 for analysis and detection to aid in obtaining the decoded data. The output of the Viterbi detector 28 provides the data stream to the system for further detection and analysis.

The output of the slicer 20 is also connected to a first input of comparison circuitry 30 typically through an equalizer (not shown). A sequence table 32 is connected to a second input of the comparison circuitry 30. The output of the comparison circuitry 30 is connected to a phase error estimator 23, which is coupled to a D to A converter 24, whose output is provided to an oscillator 26. The oscillator 26 generates the clock, clk(T), that clocks the slicer 20. For each data sample x'(T) the phase error estimator 23 determines the timing error for the data sample x'(T) and adjusts the clock frequency of the oscillator 26 through the D to A converter 24. The D to A converter 24 converts the output of the phase error estimator 23 to an analog signal to control the clock frequency of the oscillator 26.

The sequence table 32 can be any sequence table that allows the comparison circuitry to determine whether a sequence of data samples is an allowed sequence for the particular coding used for that storage system. In the preferred embodiment of the invention the sequence table 32 is an N× ... ×N matrix, where N is the number of all possible values of one data sample x'(T). The number of dimensions of the sequence table is equal to the number of samples in a sequence, for example for a 3 sample sequence the sequence table 32 is an N×N×N matrix. The coordinates of the sequence table 32 correspond to the sequences of data samples to be received. In one embodiment of the invention all sequences that can occur in the detection scheme are allowed sequences, in other embodiments of the inventions only some of the sequences that can occur in the detection scheme are allowed sequences. The sequence table 32 contains sample information at the coordinates corresponding to an allowed sequence. The sequence table 32 contains flags at all of the other locations. The sample information can be just a signal indicating that the sequence is an allowed sequence or can be information that can be used in the correction of the timing error. In one embodiment of the invention, the sample information is the slope of the data stream around the data sample.

The comparison circuitry contains a memory for storing the data samples, preferably the memory is a shift register 34. The size of the shift register 34 is selected to be large enough to store a predetermined number of previous data samples, the selected data sample x'(t), and a predetermined number of subsequent data samples that make up a sequence. The number of previous data samples and number of subsequent data samples can be any number that allows the data sequence to be large enough to accurately confirm that the data sample can occur in the detection scheme, yet small enough to not to drastically increase the latency in processing the data samples. The number of previous data samples can be larger or smaller than the number of subsequent data samples. In one embodiment a sequence having 3 data samples, one previous and one subsequent will be used, so a 3 bit shift register 34 is needed. In an alternative embodiment, five data samples are used, requiring a 5 bit shift register. In another alternative embodiment, seven data samples are used, requiring a 7 bit shift register.

The comparison circuitry 30 can be any known circuit for determining whether the value in the sequence table at the coordinates corresponding to the sequence read from the storage medium is a flag. In one example of the comparison circuitry 30, a plurality of comparators is used to compare the value stored in the sequence table 32 to determine if it is a flag or sample information. If the value stored in the sequence table 32 is not a flag, then the value stored in the sequence table 32 is passed to the output of the comparison circuitry.

In PR detection schemes, each bit is encoded using the equations for the particular detection scheme. The equation used in the PR4 detection scheme is $(1-D)(1+D)$, in an EPR4 detection scheme is $(1-D)(1+D)^2=1+D-D^2-D^3$, and in an $E^nPR4$ detection scheme is $(1-D)(1+D)^{n+1}$. D represents a one bit cell delay and $D^2$ represents 2 bit cell delays. $D=e^{-j\omega t}$, where $\omega$ is a frequency variable in radians per second and t is the sampling time interval in seconds.

Each data sample in a PR4 detection scheme can have one of 3 possible values, −1, 0, 1, making N (the size of the matrix) equal to 3. Each data sample in a EPR4 detection scheme can have one of 5 possible values, −2, −1, 0, 1, 2 making N equal to 5, and in a EEPR4 detection scheme each data sample can have one of 7 possible values, −3, −2, −1, 0, 1, 2, 3 making N equal to 7. The 0s are encoded as a sequence of zeros of an appropriate length.

All possible sequences that can occur in a particular detection scheme are determined by generating a truth table of the possible combination of bits, encoding the bits, and convolving each entry. The number of bits for the combinations depends on the number of samples and length of each encoded bit. For a sequence having three data samples, 5 bits are used in a PR4 detection scheme to generate a sequence; in an EPR4 detection scheme 6 bits are used to generate a sequence; and in an EEPR4 detection scheme 7 bits are used to generate a sequence.

TABLE A

| Bit 1 | Bit 2 | Bit 3 | Bit 4 | Bit 5 | Bit 6 |
|-------|-------|-------|-------|-------|-------|
| 0 | 0 | 0 | 0 | 0 | 0 |
| 0 | 0 | 0 | 0 | 0 | 1 |
| 0 | 0 | 0 | 0 | 1 | 0 |
| 0 | 0 | 0 | 0 | 1 | 1 |
| 0 | 0 | 0 | 1 | 0 | 0 |
| 0 | 0 | 0 | 1 | 0 | 1 |
| 0 | 0 | 0 | 1 | 1 | 0 |
| 0 | 0 | 0 | 1 | 1 | 1 |
| 0 | 0 | 1 | 0 | 0 | 0 |

TABLE A-continued

| Bit 1 | Bit 2 | Bit 3 | Bit 4 | Bit 5 | Bit 6 |
|---|---|---|---|---|---|
| 0 | 0 | 1 | 0 | 0 | 1 |
| 0 | 0 | 1 | 0 | 1 | 0 |
| 0 | 0 | 1 | 0 | 1 | 1 |
| 0 | 0 | 1 | 1 | 0 | 0 |
| 0 | 0 | 1 | 1 | 0 | 1 |
| 0 | 0 | 1 | 1 | 1 | 0 |
| 0 | 0 | 1 | 1 | 1 | 1 |
| 0 | 1 | 0 | 0 | 0 | 0 |
| 0 | 1 | 0 | 0 | 0 | 1 |
| 0 | 1 | 0 | 0 | 1 | 0 |
| 0 | 1 | 0 | 0 | 1 | 1 |
| 0 | 1 | 0 | 1 | 0 | 0 |
| 0 | 1 | 0 | 1 | 0 | 1 |
| 0 | 1 | 0 | 1 | 1 | 0 |
| 0 | 1 | 0 | 1 | 1 | 1 |
| 0 | 1 | 1 | 0 | 0 | 0 |
| 0 | 1 | 1 | 0 | 0 | 1 |
| 0 | 1 | 1 | 0 | 1 | 0 |
| 0 | 1 | 1 | 0 | 1 | 1 |
| 0 | 1 | 1 | 1 | 0 | 0 |
| 0 | 1 | 1 | 1 | 0 | 1 |
| 0 | 1 | 1 | 1 | 1 | 0 |
| 0 | 1 | 1 | 1 | 1 | 1 |
| 1 | 0 | 0 | 0 | 0 | 0 |
| 1 | 0 | 0 | 0 | 0 | 1 |
| 1 | 0 | 0 | 0 | 1 | 0 |
| 1 | 0 | 0 | 0 | 1 | 1 |
| 1 | 0 | 0 | 1 | 0 | 0 |
| 1 | 0 | 0 | 1 | 0 | 1 |
| 1 | 0 | 0 | 1 | 1 | 0 |
| 1 | 0 | 0 | 1 | 1 | 1 |
| 1 | 0 | 1 | 0 | 0 | 0 |
| 1 | 0 | 1 | 0 | 0 | 1 |
| 1 | 0 | 1 | 0 | 1 | 0 |
| 1 | 0 | 1 | 0 | 1 | 1 |
| 1 | 0 | 1 | 1 | 0 | 0 |
| 1 | 0 | 1 | 1 | 0 | 1 |
| 1 | 0 | 1 | 1 | 1 | 0 |
| 1 | 0 | 1 | 1 | 1 | 1 |
| 1 | 1 | 0 | 0 | 0 | 0 |
| 1 | 1 | 0 | 0 | 0 | 1 |
| 1 | 1 | 0 | 0 | 1 | 0 |
| 1 | 1 | 0 | 0 | 1 | 1 |
| 1 | 1 | 0 | 1 | 0 | 0 |
| 1 | 1 | 0 | 1 | 0 | 1 |
| 1 | 1 | 0 | 1 | 1 | 0 |
| 1 | 1 | 0 | 1 | 1 | 1 |
| 1 | 1 | 1 | 0 | 0 | 0 |
| 1 | 1 | 1 | 0 | 0 | 1 |
| 1 | 1 | 1 | 0 | 1 | 0 |
| 1 | 1 | 1 | 0 | 1 | 1 |
| 1 | 1 | 1 | 1 | 0 | 0 |
| 1 | 1 | 1 | 1 | 0 | 1 |
| 1 | 1 | 1 | 1 | 1 | 0 |
| 1 | 1 | 1 | 1 | 1 | 1 |

Table A shows all possible combination of bits for an EPR4 encoding scheme. Each of the entries in the Table A is encoded. One example of this is shown in Table B, using 12th entry of Table A, 001011, as the example.

TABLE B

| | | | | | | | | | |
|---|---|---|---|---|---|---|---|---|---|
| 1    | 0 | 0 | 1 | 0  | 1 | 1  | ?  | ?  | ? |
| D    | ? | 0 | 0 | 1  | 0 | 1  | 1  | ?  | ? |
| $-D^2$ | ? | ? | 0 | 0  | -1 | 0 | -1 | -1 | ? |
| $-D^3$ | ? | ? | ? | 0  | 0 | -1 | 0  | -1 | -1 |
| Sum  | ? | ? | ? | 1  | 0 | 1  | ?  | ?  | ? |

Therefore, the sequence 1, 0, 1 occurs in an EPR4 detection scheme and is one of the allowed sequences in the sequence table. Similarly, sequences that can occur in the EPR4 detection scheme are determined for each entry in Table A, thus creating the entire list of all possible sequences that can occur for the particular detection scheme. Appendix B shows all sequences that can occur in an EPR4 detection scheme. Sequence tables of sequences that can occur in other detection schemes can be similarly encoded using the equations for the detection scheme and a truth table with the appropriate number of bites, described above.

Each of the possible values of the data sample is assigned a value to be a coordinate in the sequence table; for example: −2 corresponds to 0, −1 corresponds to 1, 0 corresponds to 2, 1 corresponds to 3, 2 corresponds to 4. The sample information of the selected data sample is stored in the location corresponding to the allowed sequence. All other locations of the table contain flags.

In the preferred embodiment, the sample information is the slope of the data stream around the selected data sample. The slope around the data sample is calculated by determining the sign produced when the expected value of the preceding sample x(T−1) is subtracted from the expected value of the subsequent sample x(T+1). For example, for the sequence 1, 0, 1, the slope=sign(1−1)=0, and it is stored at location 3,2,3 of the sequence table. Storing the slope in the sequence table 32 reduces the size of the phase error estimator and increases the speed at which the phase error estimator operates since the slope is now provided to it from the sequence table and the phase error estimator does not need to determine the slope.

Appendix C shows the values of a sequence table for an EPR4 detection scheme. Appendix A shows a program in Matlab that can generate all the sequences that can occur in an EPR4 detection scheme (shown in Appendix B), and the sequence table for an EPR4 detection scheme (shown in Appendix C).

In an alternative embodiment of the invention not all sequences that can occur in the detection scheme are allowed sequences for correcting the timing, and the values in the sequence table at coordinates corresponding to some sequences that can occur in the detection scheme are set to flags. Some sequences that can occur in the detection scheme but are not allowed sequences because they are not helpful in detecting and determining the timing error of the sample. For example, the sequence 0, 0, 0 is not helpful in detecting a timing error, thus, while it can occur, it is not an allowed sequence.

As described above, the number of previous data samples and number of subsequent data samples can be any number that allows the data sequence to be large enough to accurately confirm that the data sample can occur in the detection scheme, yet small enough to not to drastically increase the latency in processing the data samples. The number of previous data samples can be larger or smaller than the number of subsequent data samples. For ease of reference an embodiment using a sequence having 3 data samples will be used to describe the operation of the invention.

In operation of this embodiment, a first data sample x'(T−1) is sampled by the slicer 20 and stored in the register 34, as the preceding sample. The selected data sample x'(T) is then sampled by the slicer 20 and stored in register 34, this is the data sample for which the timing error is being determined. Another data sample x'(T+1), the subsequent data sample, is sampled by the slicer 20 and stored in the register 34. The samples form the sequence. The coordinates corresponding to the sequence are determined in the comparison circuitry 30, and the value in the sequence table 32 at the coordinates corresponding to sequence is retrieved. The comparison circuitry 30 determines if the value is a flag. If the value is a flag, no correction is performed by the phase error estimator, this can be accomplished by passing a slope of zero to the phase error estimator 23. If the value is not a flag, the value stored in the sequence table 32 is passed to the phase error estimator 23 as the slope of the data stream around the selected data sample x'(T).

The phase error estimator 23 determines the timing error of the data sample by multiplying the slope by the sample error. The sample error of the data sample is obtained by subtracting the value of the data sample x'(T) from the expected value of the sample x(T). When the slope is zero, the timing error is zero. There is no correction, and the clock frequency of the oscillator 26 is not adjusted. In the embodiment of the invention where the slope is the sample information, the slope output by the comparison circuitry 30 is zero when the slope around the selected data sample x'(T) is actually zero, or when the sequence is not an allowed sequence and there is a flag in the sequence table at the coordinates corresponding the sequence.

For each new data sample, the data samples in the shift register 34 are shifted by one. The selected data sample x'(T), becomes the previous data sample x'(T−1). the subsequent data sample x'(T+1) becomes the selected data sample x'(T). The next data sample just received from the slicer 20 becomes the subsequent data sample x'(T+1). The above process is now repeated to obtain the timing error of the new data sample x'(T). This process is repeated for all the data samples in the data stream.

Figure 3:
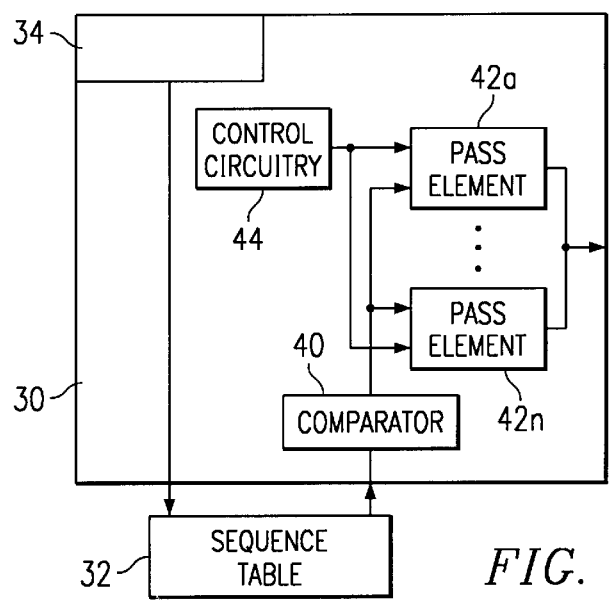
FIG. 3 is a block diagram of one example of the comparison circuitry including the override circuitry.

Optionally, override circuitry can be added to allow programming of the comparison circuitry 30 and sequence table 32 to program a sequence to not be an allowed sequence. The override circuitry can be any circuitry that either passes through the slope in the sequence table 32 or passes a zero. FIG. 3, shows one example of the override circuitry. Each override pass element 42a . . . 42n, has a programming input connected to the output of a control circuit 44, respectively, and an input connected to the sequence table. There is one override pass element 42a . . . 42n for each sequence. The control circuitry is programmed to indicate that some sequences that can occur in the detection scheme are not allowed. The pass elements 42a . . . 42n pass through the sample information or a zero based on the control circuit.

Figure 4:
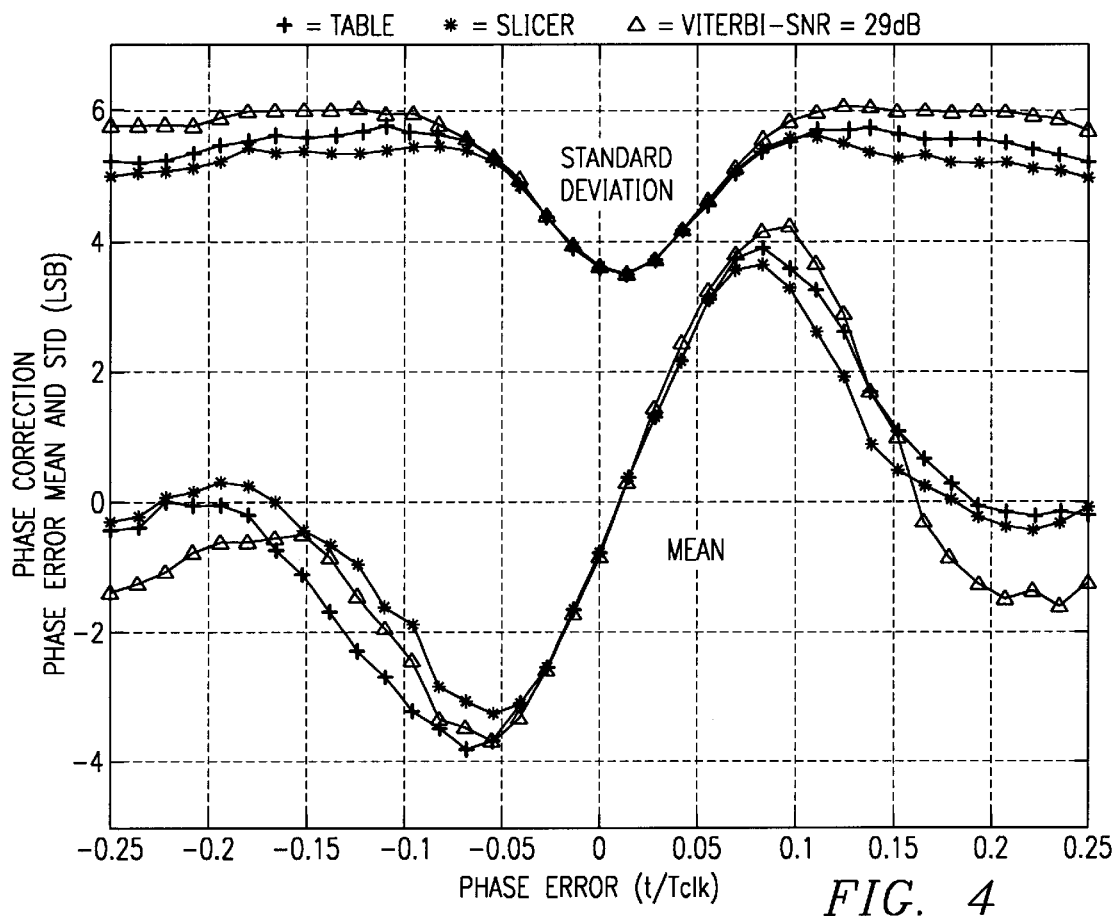
FIG. 4 illustrates the timing correction vs. the phase error.
Figure 5:
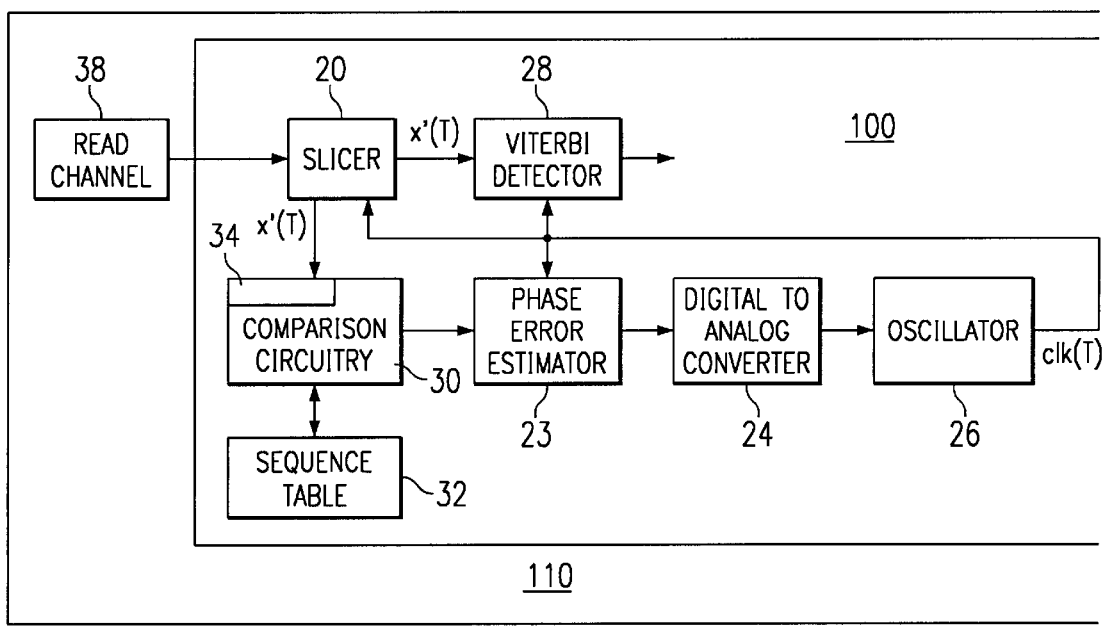
FIG. 5 is a block diagram of disc drive having a detector according to an embodiment of the present invention.

FIG. 4 shows a plot of the phase correction vs. the phase error. Using the present invention gives a wider range where the phase correction is of the same sign as the phase error. Having the phase correction of the same sign as the phase error reduces the phase error, a phase correction of the opposite sign as the phase error actually increases the phase error. This, in turn, increases the possibility that the phase correction of the next data sample will not be of the same sign as the phase error, throwing off the timing of the system further. The current invention produces a phase correction that has a lower standard deviation about the same phase error than the slicer does alone, or with the Viterbi detector. Thus, using the sequence table produces a more accurate phase correction.

Referring again to FIG. 2, in an alternative embodiment of the invention, the coordinates of the sequence table 32 are values assigned to the possible previous and subsequent data samples, and the value stored at those coordinates is an expected value x(T) of the selected data sample. In operation, a first data sample x'(T−1) is sampled by the slicer 20 and stored in the register 34, as the preceding sample. The selected data sample x'(T) is then sampled by the slicer 20 and stored in register 34, this is the data sample for which the timing error is being determined. Another data sample x'(T+1), the subsequent data sample, is sampled by the slicer 20 and stored in register 34.

The previous and subsequent samples x'(T−1) and x'(T+1) form the sequence. The coordinates corresponding to the sequence are determined in the comparison circuitry 30, and the value in the sequence table 32 at the coordinates corresponding to sequence is retrieved. The comparison circuitry 30 determines if the value is a flag. If the value is a flag a timing correction of zero is passed to the phase error estimator 22 and the clock frequency of oscillator 26 is not adjusted. If the value is not a flag, the comparison circuitry determines if the sequence is unique. If the sequence is unique the value in the sequence table 32 is used as the expected value x(T) of the data sample x'(T), otherwise the data sample is used to generate its expected value x(T).

The phase error estimator 23 determines the timing error of the data sample by multiplying the slope by the sample error. The sample error of the data sample is obtained by subtracting the value of the data sample x'(T) from the expected value of the sample x(T). The slope is determined in the phase error estimator 22 by subtracting the previous data sample x'(T−1) from the subsequent data sample x'(T+1). When the slope is zero, the timing error is zero and there is no correction; the clock frequency of the oscillator 26 is not adjusted.

The data samples in the register 34 are shifted by one. If the sequence is allowed and unique the value in the sequence table 32 is stored as the previous data sample x'(T−1), otherwise the selected data sample x'(T) becomes the previous data sample x'(T−1). The subsequent data sample x'(T+1) becomes the selected data sample x'(T), and the next data sample just received from the slicer 20 becomes the subsequent data sample x'(T+1). The above process is now repeated to obtain the timing error of the new selected data sample x'(T). This process is repeated for all the data samples in the data stream.

Using a sequence of data samples surrounding a data sample to determine if the data sample is read correctly, and only using correct data samples to determine timing errors, allows the timing error to be corrected only when accurate information is available. The sequence of data samples is compared using comparison circuitry to the allowed sequences stored in a sequence table. When the sequence is allowed, then there is high likelihood that data sample is correct, and the timing error for the data sample is determined and used to correct the timing error of the system. Otherwise, no correction is made for the timing error. In the preferred embodiment of the invention, the coordinates of the sequence table correspond to the data samples, and the slope of the data stream at the data sample is stored in the sequence table. This reduces the size of the phase error estimator and increases the speed at which the phase error estimator operates since the slope is now provided to it from the sequence table and the phase error estimator does not need determine the slope.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

We claim:

1. A detector, comprising:
   a slicer operable to receive a clock signal and a data signal, to sample the data signal, and to generate a sequence of data samples;

a sequence table operable to store predetermined information corresponding to the sequence of data samples and to provide the stored information in response to the sequence;

a phase-error estimator operable to use the stored information to determine a phase error between the clock signal and a data sample from the sequence of data samples and to generate a phase-correction signal corresponding to the determined phase error; and comparison circuitry coupled to the slicer, the sequence table, and the phase-error estimator, the comparison circuitry operable to determine whether the stored information provided by the sequence table is valid and to provide the stored information to the phase-error estimator if the stored information is valid.

2. The detector of claim 1, further comprising an oscillator coupled to the phase-error estimator and to the slicer, the oscillator operable to generate the clock signal and to adjust the phase of the clock signal in response to the phase-correction signal.

3. The detector of claim 1, wherein the detector is an EPR4 detector.

4. The detector of claim 1 wherein:

the data samples each have an actual value and an expected value; and the stored information comprises a polarity of a difference between the expected values of two data samples within the sequence.

5. The detector of claim 1 wherein:

the data samples each have an actual value and an expected value; and the stored information comprises the expected value of a data sample within the sequence.

6. The detector of claim 1 wherein the sequence comprises three data samples.

7. The detector of claim 1 wherein the sequence comprises five data samples.

8. The detector of claim 1 wherein the sequence comprises seven data samples.

9. The detector of claim 1 wherein the comparison circuitry is operable to provide predetermined information to the phase-error estimator if the stored information is invalid, the predetermined information operable to cause the phase-error estimator to generate the phase-correction signal having a no-phase-correction value.

10. The detector of claim 1 wherein the sequence of data samples corresponds to a portion of the data signal that is not centered about a peak or a zero crossing of the data signal.

11. A detector for receiving data that is part of a data stream, the detector comprising:

a slicer for receiving a clock signal and the data, sampling the data, and generating a sequence of data samples;

a sequence table for storing respective predetermine values for possible sequences of data samples; and comparison circuitry coupled to the slicer and to the sequence table, the comparison circuitry operable to determine whether the stored value for a data sequence is valid and to provide the stored value for synchronization of the clock signal with the data if the stored value is valid.

12. The detector of claim 11, further comprising a phase-error estimator coupled to the comparison circuitry and operable to synchronize the clock signal with the data using a valid stored value provided by the comparison circuitry.

13. The detector of claim 12, further comprising an oscillator coupled to the phase-error estimator and to the slicer and operable to generate the clock signal.

14. The detector of claim 11, further comprising override circuitry coupled to the sequence table and to the phases-error estimator and programmable to prevent the comparison circuitry from providing a valid stored value for a predetermined sequence of data signals to the phase-error estimator.

15. The detector of claim 11 wherein the sequence table is operable to store valid values only for respective sequences that occur in a detection scheme of the detector.

16. The detector of claim 11, wherein the detector comprises an EPR4 detector.

17. The detector of claim 11 wherein the sequence table is for storing respective values for each possible sequence of data samples.

18. A system, comprising:

a detector for decoding data, the detector comprising, a slicer for receiving a clock signal and the data, sampling the data, and generating a sequence of data samples, a sequence table for storing respective predetermined values for possible sequences of data samples, and comparison circuitry coupled to the slicer and to the sequence table, the comparison circuitry operable to determine whether the stored value for a data sequence is valid and to provide the stored value for synchronization of the clock signal with the data if the stored value is valid.

19. The system of claim 18, further comprising:

a disc having the data stored thereon; and a read channel coupled to receive the data from the disc and to provide the received data to the slicer.

20. The system of claim 18, wherein the detector further comprises a phase-estimator coupled to the comparison circuitry.

21. The system of claim 20, further comprising a clock oscillator coupled to the phase-error estimator and to the slicer.

22. The system of claim 20, further comprising override circuitry coupled to the sequence table and to the phase-error estimator and programmable to prevent the comparison circuitry from providing a valid stored value for a predetermined sequence of data samples to the phase-error estimator.

23. The disc drive of claim 18, wherein the detector comprises an EPR4 detector.

24. A disc drive, comprising:

a read channel for reading data that is part of a data stream from a storage medium; and a detector for decoding the data, the detector comprising, a slicer operable to receive a clock signal and the data to sample the data, and to generate a sequence of data samples, a sequence table operable to store predetermined information corresponding to the sequence of data samples and to provide the stored information in response to the sequence, a phase-error estimator operable to use the stored information to determine a phase error between the clock signal and a data sample from the sequence of data samples and to generate a phase-correction signal corresponding to the determined phase error, and comparison circuitry coupled to the slicer, the sequence table, and the phase-error estimator, the comparison circuitry operable to determine whether the stored information provided by the sequence table is valid and to provide the stored information to the phase-error estimator if the stored information is valid.

25. The disc drive of claim 24, further comprising a clock oscillator coupled to the phase-error estimator and to the slicer and operable to generate the clock signal.

26. The disc drive of claim 24, further comprising override circuitry coupled to the sequence table and to the phase-error estimator and programmable to prevent the comparison circuitry from providing valid stored information for a predetermined sequence of data samples to the phase-error estimator.

27. The disc drive of claim 24, wherein the sequence table is operable to store valid information only for sequences that occur in a detection scheme of the detector.

28. The disc drive of claim 24, wherein the detector comprises an EPR4 detector.

* * * * *